United States Patent Office 3,110,455
Patented Nov. 12, 1963

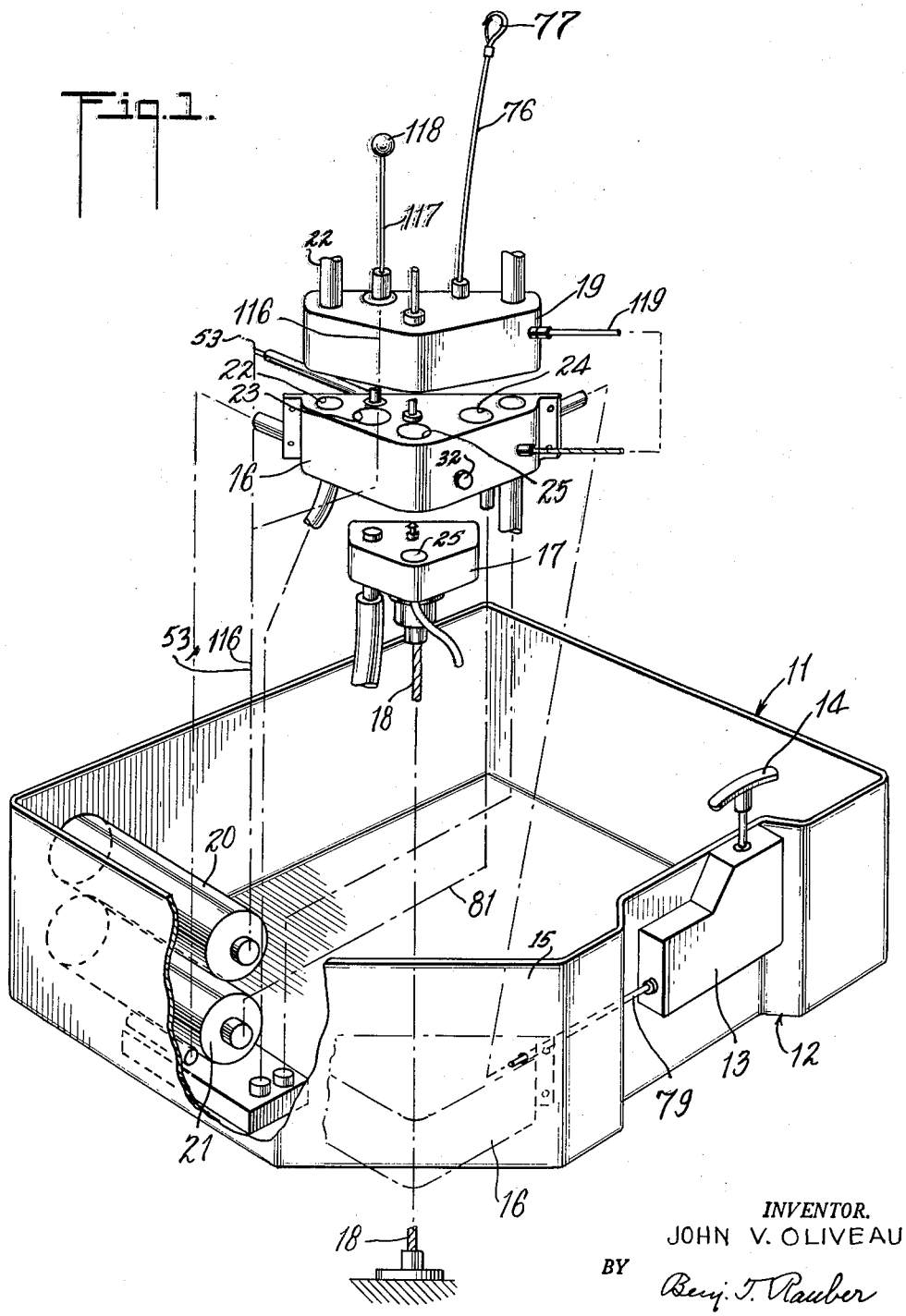

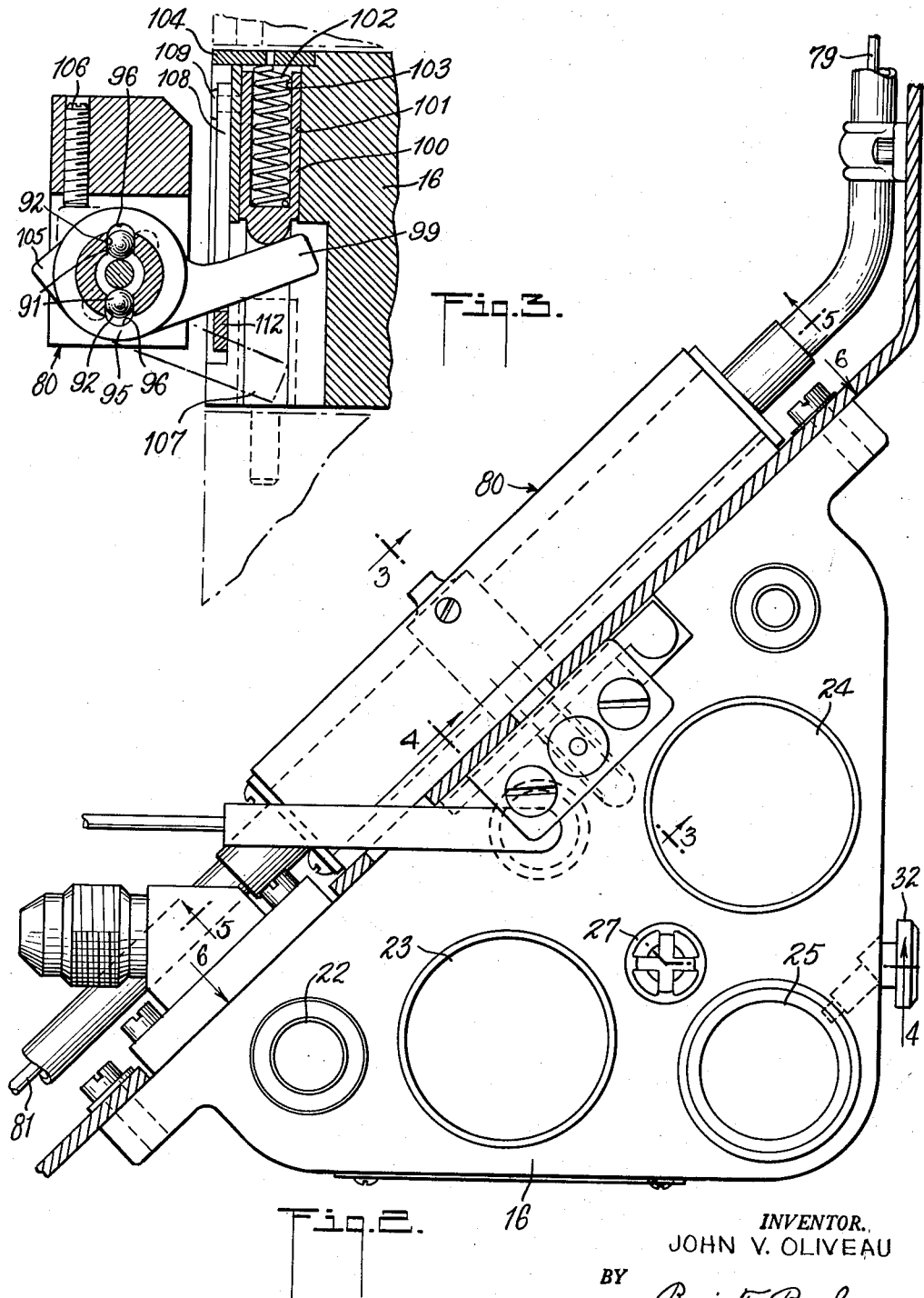

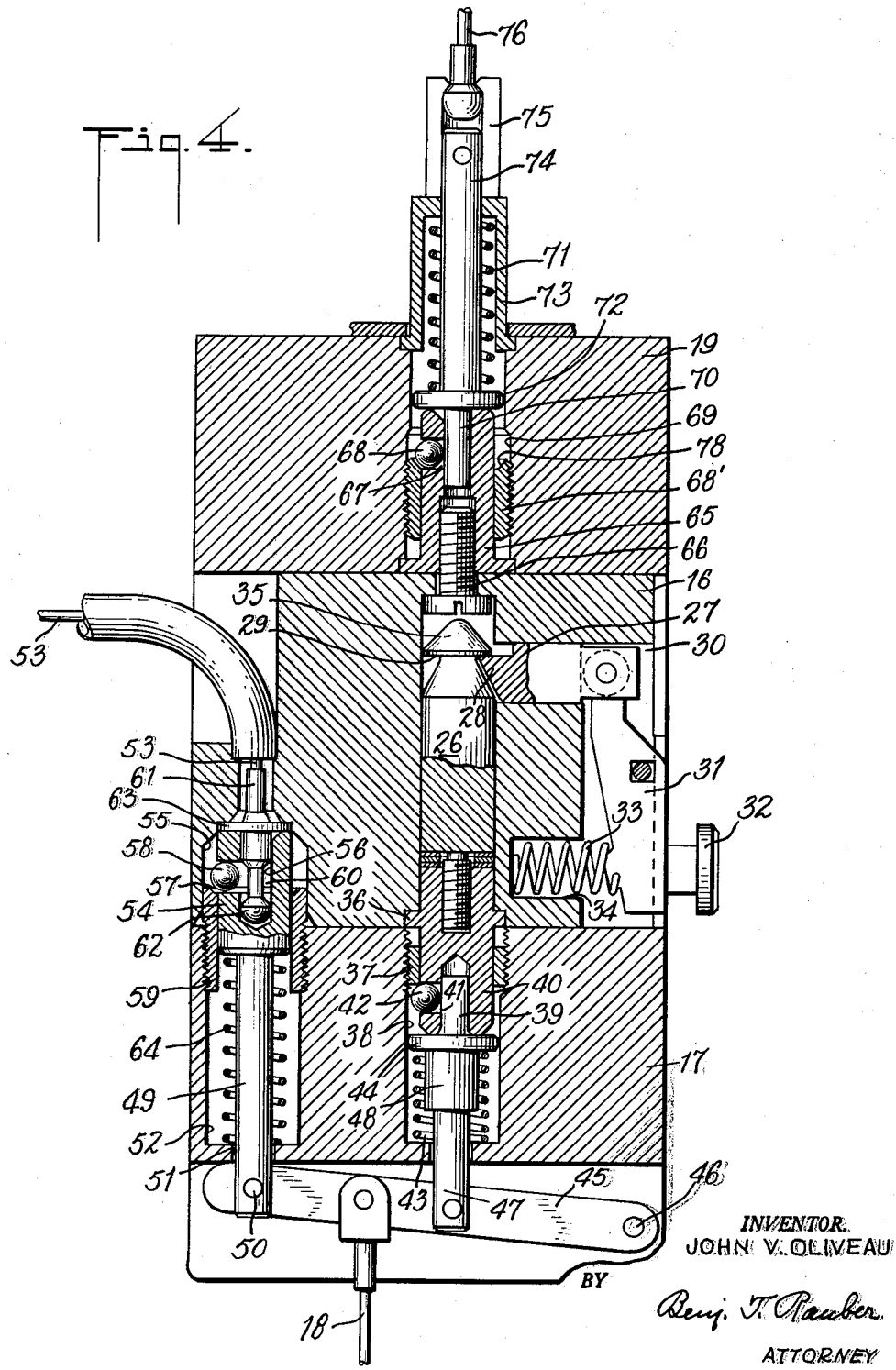

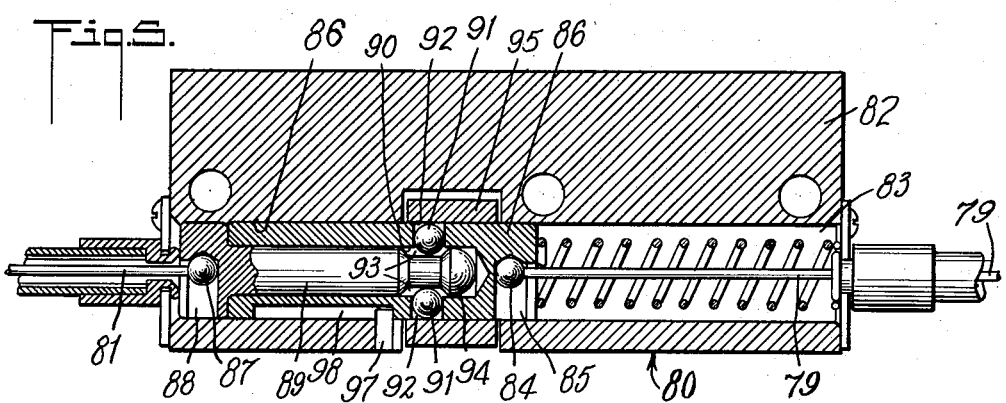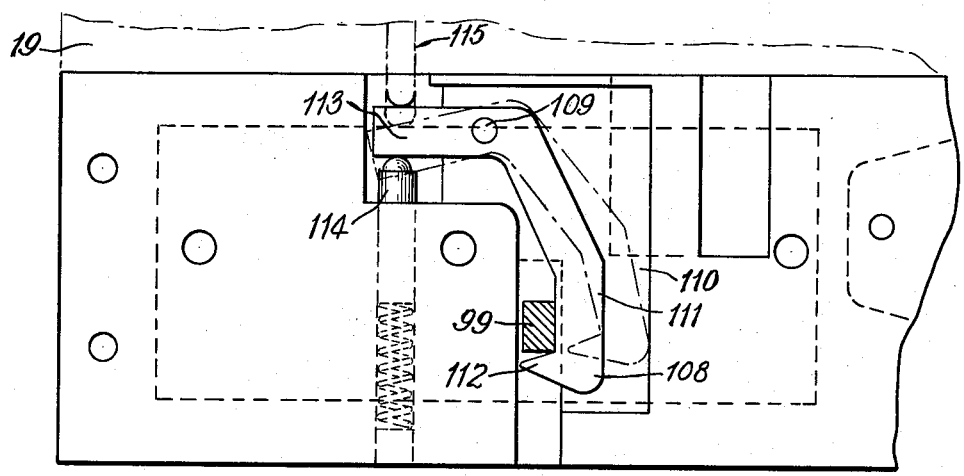

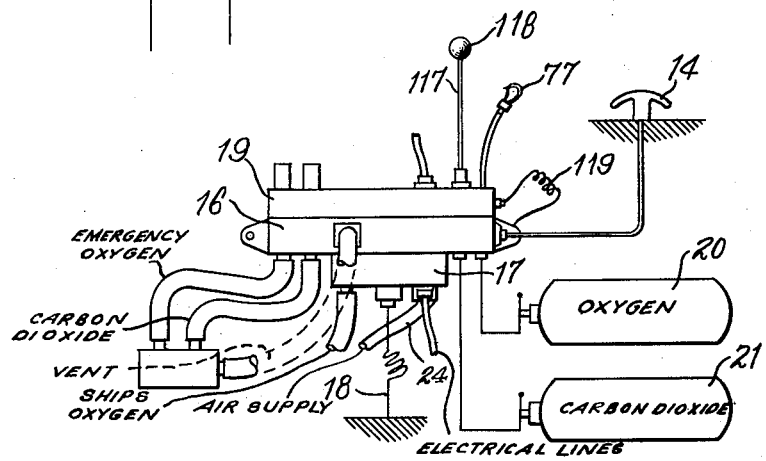
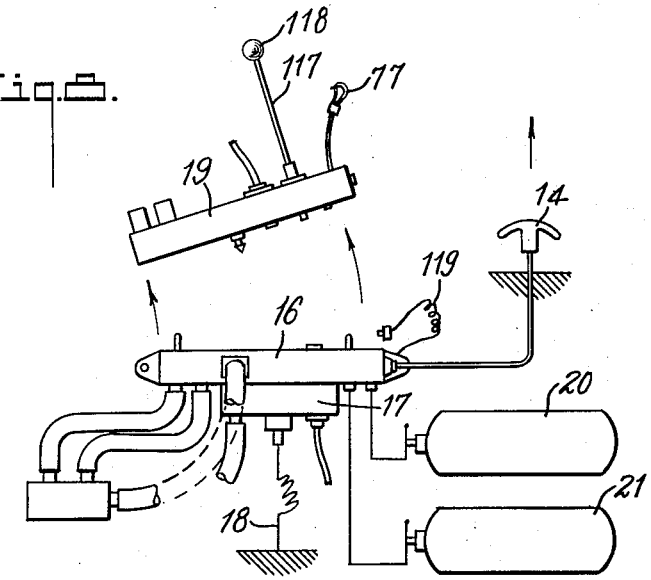

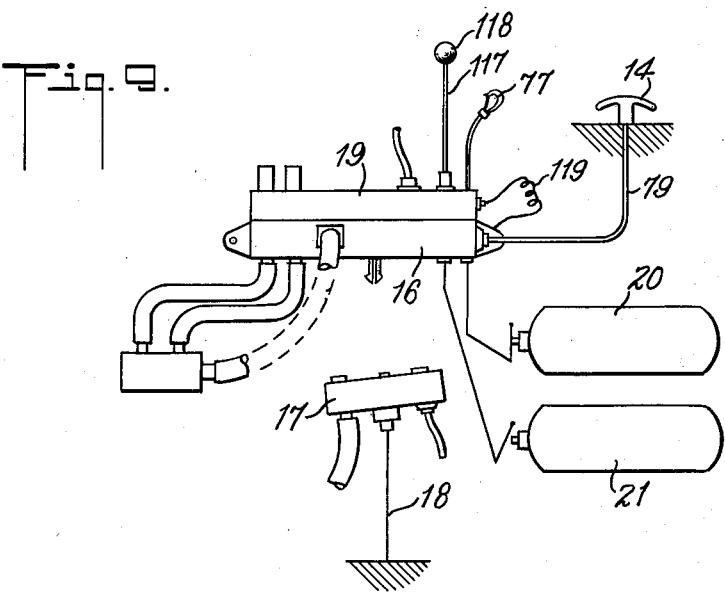
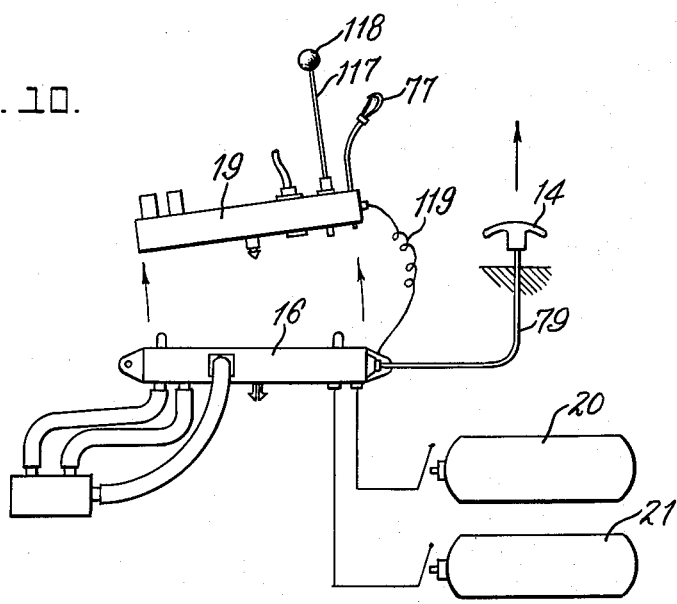

3,110,455
DISCONNECT AND SURVIVAL KIT ASSEMBLY FOR AIRCRAFT PERSONNEL
John V. Oliveau, Greenwich, Conn., assignor to Aerotec Industries, Inc., Greenwich, Conn., a corporation of Connecticut
Filed Mar. 21, 1960, Ser. No. 16,396
18 Claims. (Cl. 244—1)

My present invention relates to disconnects for aircraft personnel. The disconnect of my invention is directed to conditions prevailing at high altitudes where the pilot or other personnel is normally supplied with oxygen from the aircraft or ship but, upon bailing out, is disconnected from the ship supply and is supplied from an emergency supply of limited amount carried by the pilot, generally in an emergency kit. The emergency kit also carries other emergency equipment including an inflatable life raft and a supply of carbon dioxide for inflating it.

The disconnect must automatically disconnect the pilot from the oxygen supply of the ship but when the pilot or other personnel leaves the ship while on the ground the emergency oxygen supply and the carbon dioxide must not be released. When the pilot is ejected while in flight, not only must the ship's oxygen supply be disconnected but the emergency oxygen supply must be released for use and, when the pilot descends to the ocean, sea, or other body of water, the carbon dioxide supply must be made available for inflation of the life raft.

My present invention provides a disconnect that automatically accomplishes these various functions as occasion requires.

The disconnect of my invention comprises three separable parts or blocks co-operating with a survival kit. One of these blocks, intermediate between the other two is permanently mounted on the survival kit which contains an emergency oxygen supply, a supply of carbon dioxide and an inflatable life raft and other survival equipment. The upper block, normally mounted on the intermediate block, is permanently secured to the pilot. The under block is secured to the aircraft or ship.

When the pilot leaves the ship while on the ground, he need only to pull a release and the upper block may then be disconnected, whereupon it may be separated from the intermediate block, separating the pilot's breathing apparatus from the ship's oxygen supply. The pilot may thus leave and return to the ship without setting in action any apparatus other than to disconnect and connect his breathing apparatus from and to the ship's oxygen supply.

When the pilot is ejected from the ship above the ocean or sea, the upper and intermediate blocks remain connected and separate as a unit from the lower block which remains with the ship. The emergency oxygen supply in the survival kit is released to the breathing equipment of the pilot. The survival kit may be disposed beneath the aircraft seat when the arrangement is such that the seat is ejected with the pilot. The carbon dioxide release is armed or cocked but not opened. All electrical connections with the ship are, of course, disconnected.

As the pilot nears the surface of the body of water, he releases the intermediate block and survival kit by means of the release as in leaving the ship on the ground. The intermediate block thereupon falls away from the upper block and pilot. The emergency oxygen supply is disconnected from the pilot as he no longer has need of it. The carbon dioxide supply is released, inflating the life raft. The survival kit is secured to the upper block by a lanyard of limited length, as, for example, twenty-five feet, so that the pilot may recover it when he reaches the water.

The disconnect of my invention therefore comprises means whereby the upper block may be separated from the intermediate and lower blocks without opening or releasing the carbon dioxide supply to the life raft and whereby, upon separation of the upper block from the intermediate block after their separation from the lower block, the carbon dioxide is supplied to the life raft. This is accomplished by providing a coupling between the element actuated by the pilot and the carbon dioxide release which is rendered inoperative when the lower block is attached to the intermediate block and operative when the intermediate and upper blocks are separated from the lower block.

An embodiment of my invention is illustrated by way of example in the accompanying drawings, in which:

FIG. 1 is an exploded, perspective view of the survival kit and the upper, intermediate and lower blocks, the position of the intermediate block attached to the survival kit being shown in broken lines, FIG. 2 is a plan of a portion of the survival kit and the blocks in position thereon, FIG. 3 is a section of a portion of the survival kit and blocks, taken on line 3—3 of FIG. 2, FIG. 4 is a vertical section of the assembled blocks taken on line 4—4 of FIG. 2, FIG. 5 is a vertical section of a portion of the embodiment taken on line 5—5 of FIG. 2, FIG. 6 is a side elevation of the blocks taken from the line 6—6 of FIG. 2, FIG. 7 is a schematic side view of the blocks assembled as in normal use, FIG. 8 is a similar view of the blocks with the upper block released when the aircraft is on the ground, FIG. 9 is a similar view showing the release of the upper and intermediate blocks as a unit when the pilot is ejected from the ship, and, FIG. 10 is a side view of the upper and intermediate blocks with the intermediate block released with the survival kit for landing on water.

As illustrated in the drawings notably FIG. 1, the emergency kit comprises a casing 11 generally of rectangular shape, for example, one having one side recessed as at 12 to receive a manually operable element 13 having a handle 14 and having one corner truncated by a wall 15 to provide a space for the attachment of an intermediate block 16 of triangular horizontal section. A lower block 17 is detachably secured to the under side of the block 16 and is secured to the ship by a cable or lanyard 18 of sufficient length to permit limited upward movement of the block without being disconnected from the intermediate block 16. An upper block 19 remains with the pilot when he leaves the ship and may be secured to the pilot's suit and is mounted on the intermediate block to be disconnected when the pilot leaves the ship while on the ground and also when the survival kit is to be disconnected when the pilot reaches the surface of a body of water after bailing out. An emergency oxygen supply bottle 20 and a carbon dioxide supply bottle 21 are contained in the survival kit, together with an inflatable raft and other emergency equipment, not shown.

The blocks are provided with passages for the supply of oxygen from the ship's supply, compressed air for pressurizing the pilot's suit, vent lines for the suit and electrical communications from the pilot to the ship. For example, the emergency oxygen supply passes through the passage 22 in blocks 16 and 19, exhaust from the pilot's mask is vented through the passage 23, and air or oxygen for pressurizing the pilot's suit passes through passage 24. Electric connections are made through 25. When the lower block 19 is separated from the intermediate block the oxygen and air passages are disconnected from the ship and connected to receive oxygen from the emergency supply by means of valve mechanisms not shown.

A disconnect means is provided for the intermediate block 16 and the lower block 17 which permits the lower block to be disconnected manually for servicing, inspection and for other purposes without releasing the emergency oxygen supply. However, when the pilot bails out the lower block is automatically disconnected and the emergency oxygen supply is released as the pilot is ejected. This disconnect means is shown in FIG. 4.

The upper element 26 of the disconnect is received in a vertical hole in the intermediate block 16 and is held from withdrawal downwardly by means of a horizontally sliding latch 27 which has a wedge shaped end 28 which engages a complementary annular recess 29 in the upper end portion of the element 26. The latch 27 is slidable horizontally in a passage 30 and is attached to the upper arm of a vertical lever 31 having a knob 32 on its lower arm. The lever is normally biased counter clockwise by a spring 33 confined between the lower arm of the lever and the bottom of a recess 34 of the block 16 to hold the latch 27 in engagement in the recess 29. When the knob 32 is manually pressed inwardly, the lever 31 swings clockwise to withdraw the latch and permit the element 26 to be withdrawn downwardly as the lower block is separated from the intermediate block. To re-assemble or connect the blocks 17 and 16 the element 26 need only by inserted into its recess until the recess 29 is level with the latch 27. To facilitate this insertion the upper tip of the element is pointed as at 35. A peripheral flange 36 is provided on the element in such position that it enters a recess in the intermediate block when the upper end of the element is in latching position, thus holding the element securely in locking position.

Below the flange 36 the element 26 projects downwardly through a retaining ring 37 into a vertical hole 38 in the lower block 17. Its lower end is recessed to receive an upwardly extending locking pin 39 and to form an annular wall 40. One or more transverse openings 41 are provided in the annular wall and a ball 42 of larger diameter than the thickness of the annular wall is provided in each opening. These openings 41 are at a level such that with the elements assembled as shown in FIG. 4 the ball or balls 42 project outwardly of the wall beneath the lower edge of the ring 37 so that the element 26 can not be withdrawn from the lower block. However, when the locking pin 39 is withdrawn downwardly from the recessed lower end of the element the ball or balls 42 may move inwardly to project into the recess and to clear the ring 37 and the element may be withdrawn upwardly free from the ring 37 to disconnect the lower block from the intermediate block. The locking pin 39 is resiliently held in locking position as shown in FIG. 4 by means of a spring 43 confined between the lower end of the hole or recess 38 and an annular flange 44 on the lower end of the locking pin. The flange 44 abuts the lower end of the annular wall 40 to position the pin in locking position.

When the pilot is ejected in bailing out of the ship the disconnects move upwardly and the locking pin 39 is held from upward movement by a lever mechanism attached by the lanyard 18 to the ship. This lever mechanism also serves to release the emergency oxygen supply. The lever mechanism comprises a lever 45 pivoted at 46 to the under part of the lower block and attached to a stem 47 of the locking pin 39 which extends from the flange 44 downwardly through a hole in the bottom of vertical hole 38. The lanyard 18 is of sufficient length to permit the pilot to move freely without pulling the lanyard taut but is pulled taut when the pilot, the emergency kit and the disconnect are ejected to the length of the lanyard. Thereupon further movement of the pilot and the disconnect pulls downwardly the stem 47 until the locking pin clears the ball 42 and an enlargement 48 of the stem 47 reaches the bottom of the hole 38 and exerts a downward pull on the lower block 17. The ball 42 is then pushed by the lower edge of the ring 37 inwardly sufficiently to unlock the ring and the lower block from the wall 40 and release the lower block.

The lever 45 also serves to actuate the emergency oxygen release as it swings downwardly relative to the lower block. This is accomplished through a rod 49 pivoted at 50 to the lever 45 and extending upwardly through an opening 51 into a recess 52 opening upwardly from the lower block. The rod 49 is connected through an interlock to a cable 53 extending to the release valve of the emergency oxygen supply. The interlock comprises an enlargement 54 of the upper end of the rod 49 extending beyond the upper surface of the lower block into a downwardly opening recess 55 in the intermediate block 16. The enlargement is recessed downwardly from its upper end as at 56 to form an annular wall which has one or more lateral openings 57 each having a locking ball 58 of a diameter larger than the thickness of the annular wall. The enlargement 54 slides vertically in a retaining collar 59 secured in the upper part of the recess 52 and extending to or short of the ball 58 so that the ball may project over the upper edge of the collar 59. When the rod 49 is pulled downwardly by the lever 45 and lanyard 18 the ball 58 is pushed inwardly by the upper edge of the collar 54 to project into the recess 56, the upper inner edge of the collar being beveled to facilitate this inward displacement of the ball. The projecting portion of the ball is received in an annular groove 60 of a rod 61 connected to the emergency release cable 53 and above a head 62 of the rod below the recess 60. Upon further downward movement of the lever 45 and rod 49 as the pilot is ejected further, the projecting portion of the ball 58 engages the head 62 and pulls the rod 61 and cable 53 to effect the release of the emergency oxygen. To position the rod 61 in relation to the ball 58 it is provided with a flange 63 to fit against a flat upper surface of the recess 55. To provide that the upper end of the enlargement 54 shall normally be in co-operative relation to the collar 59, the rod 49 is biased upwardly by a spring 64 confined between the lower end or bottom of the recess 52 and the enlargement 54 of the rod. It will be noted that when the lower block is released by withdrawing the latch, the elements of the locking mechanism remain as shown in FIG. 4 and the rod 61 may be moved out of the recess 60 freely. When the lever has been tilted sufficiently, or the lower block 17 has been pulled free of the intermediate block 16, the rod 49 and the enlargement 54 will slide downwardly against the force of the spring 64 until the ball 58 is below the lower edge of the collar 59. Thereupon the ball 58 will slide sidewise out of the recess 60 so that the rod 61 may slide upwardly free of the enlargement 54 and accordingly free of the lower block 17. The collar 59 also slides downwardly out of the recess 55 as the released lower block moves downwardly from the intermediate block.

The upper block 19 is locked to the intermediate block 16 by a locking mechanism which may be released by the pilot. This mechanism comprises a short tubular element 65 projecting upwardly from the upper surface of the intermediate block 16 and secured thereto by a screw 66. Shortly below the upper end of the element 65 at least one opening 67 is provided in the wall of the element 65 in which is a ball 68 of a diameter greater than the thickness of the wall. When the blocks are assembled the element 65 extends upwardly through a collar 68' screwed into a vertical hole 69 in the upper block, the upper end of the collar being at or slightly lower than the opening 67 so that the ball 68 may project slightly over the upper edge of the collar. The ball is kept in this position as shown in FIG. 4 by a locking pin 70 extending downwardly into the element and held resiliently in this locking position by a spring 71 confined between a flange 72 on the pin and a thimble 73 secured to the upper surface of the upper block. The pin 70 is provided with a stem 74 extending upwardly from the flange 72 through the thimble. The upper end of the stem is connected by a coupling 75 to a cable 76 having a loop or handle 77, FIG. 1, positioned to be accessible to the pilot.

When the locking pin 70 is in locking position as shown in FIG. 4 it prevents the ball 68 from moving inwardly. It is impossible to pull the upper block loose from the intermediate block as the projecting part of the ball locks the collar 68' from passing upwardly past the ball. To disconnect the upper block from the intermediate block the pilot pulls upwardly on the cable 76. This first withdraws the locking pin from the element 65 thereby permitting the ball 68 to move inwardly or to be pushed inwardly by the upper edge of the collar 68' which may be beveled as at 73 for this purpose. This enables the collar 68' to move past the ball and as the flange 72 moves upwardly to compress the spring 71 the upper block may be pulled loose from the intermediate block.

As the upper block is pulled loose from the intermediate block after the lower block has been disconnected the kit to which the intermediate block is attached will fall. At this time the carbon dioxide supply is released to inflate the life raft by means of mechanism shown in FIGS. 1, 2, 3, 5 and 6. To release the carbon dioxide the pilot pulls the handle 14 upwardly and draws with it a cable 79. The cable 79 extends to a coupling element 80 within the casing 11 of the kit immediately facing the intermediate block 16. In the coupling element the cable 79 is coupled to a cable 81 connected to the carbon dioxide release which is actuated by the tension of the cable.

The coupling element 80 serves to couple the cable 79 to the cable 81 only when the lower block has first been disconnected and then the upper block is disconnected. It is so constructed that it is inoperative when only the lower block is removed or when only the upper block is removed or when the upper block is removed before removing the lower block. This permits the apparatus to be serviced without danger of releasing the carbon dioxide by an accidental pull on the cable 79.

As shown in FIG. 5, the coupling element 80 comprises a housing 82 having a bore or passage 83 extending from one end to the other. The end of the cable 79 enters the bore from one end and is provided with a head or knob 84 which is engaged and secured in a slotted recess 85 of a shuttle 86 which is slidable longitudinally in the bore. The cable 81 enters the other end of the bore and has a head or knob 87 which is received and held by a slotted recess 88 of a connecting rod 89 which is slidably received in a recess 90 extending longitudinally from the head 87 toward the opposite end of the shuttle. The shuttle 86 and connecting rod are locked together by a pair of balls 91 each in a hole 92 in the wall of the shuttle and of larger diameter than the thickness of the wall so that they project into a recess 93 in the connecting rod. When the shuttle 83 is pulled to the right of the position shown in FIG. 5 the balls abut a head 94 of the rod thereby pulling the rod 89 and cable 81 to release the carbon dioxide.

The balls 91 are held in locking position as shown in FIG. 5 or alternatively released from locking position by means of a coupling release comprising a rotatable collar 95 having a pair of longitudinal grooves 96 as shown in FIG. 3. In the position shown in full lines in FIG. 3 the grooves are aligned with the holes 92 and when the shuttle is moved to the right the balls 91 are displaced into the grooves sufficiently to clear the head 94 of the locking rod 89 and the shuttle may then be moved longitudinally free of the locking rod. The edge of the head and the opposite edge of the groove are beveled to facilitate this displacement. However, when the collar 95 is rotated to the position shown in broken lines in FIG. 3 the groove 96 is displaced from alignment with the holes 92 and the balls are confined by the collar to project into the recess 93 so that when the cable 79 is pulled to the right pulling the shuttle 86 with it the balls abut the head 94 pulling the rod 89 and cable 81 to release the carbon dioxide. The shuttle 86 is prevented from rotating with the collar by means of a peg 97 fixed in the housing 82 and projecting into a longitudinal groove 98 in the shuttle.

The collar 95 is moved from the inoperative position shown in full lines in FIG. 3 by means of an arm 99 projecting from the collar transversely to its axis of rotation. It is pressed clockwise by a plunger 100 slidable vertically in a guideway 101 in the block 16 and spring pressed downwardly by a spring 102 in a recess 103 in the plunger and confined between the bottom of the recess and a cover plate 104. The spring pressed plunger tends to rotate the collar until a projection 105 on the collar is brought into abutment with a stop screw 106 in the housing 82.

When the lower block 17 is connected to the intermediate block 16 the arm 99 is raised to the full line position of FIG. 3 by a stud 107 secured to and projecting upwardly from the lower block. When the upper block is removed the arm is locked also in its upper position by a latch lever 108, FIGS. 3 and 6, pivoted on a pin 109 and contained within a recess 110 in the intermediate block 16. The latch lever is of bellcrank shape having a depending arm 111 and a hook 112 to project beneath the arm 99 of the collar 95 and a horizontal arm 113. The latch lever is biased blockwise by a spring pressed plunger 114 in the housing 82 to the full line position of FIG. 6 to bring the hook 112 beneath the arm 99 and thus hold the connector in inoperative condition. When the upper block is placed on the intermediate block a stud 115 projecting downwardly from the upper block depresses the horizontal arm 113 of the latch lever 108, swinging the latch lever clockwise until the hook 112 clears the arm 99.

When the upper block 19 is connected on the intermediate block 16 the latch lever 108 will be in the position shown in broken lines in FIG. 6, the arm 99 is held in the position shown in full lines only by the upwardly projecting stud 107 of the lower block and will be moved by the spring pressed plunger 100 downwardly to the broken line position of FIG. 3 only when the lower block 17 and with it the stud 107 is disconnected. The connector is thus "armed" or rendered operative when the lower block is disconnected while the upper block is in place on the intermediate block. Such a condition exists when the pilot is ejected on bailing out. If the upper block is disconnected and removed, the latch lever is moved to the full line position of FIG. 6 and the lower block may then be removed without armoring the connector.

As described above the cable 81, when pulled by the cable 79, releases the carbon dioxide supply. It may also release the latches of the kit cover to open the kit and otherwise place other equipment of the kit in operative condition as required. In addition to releasing the emergency oxygen supply when the lower block is detached from the intermediate block by means of the lanyard 18 the emergency oxygen supply may be released when required in flight as, for example, upon a failure of the ship's oxygen supply, by means of a cable 116, FIG. 1 connecting the emergency oxygen supply to a rod 117 having a knob 118, known as the "green apple" projecting upwardly from the disconnect.

The positions of the elements of the disconnect in various conditions of operation are shown in FIGS. 7 to 9 of the drawings. In FIG. 7 the upper, intermediate and lower blocks are connected. The pilot is connected to the ship's oxygen supply, air supply and electric system. The emergency oxygen supply and the carbon dioxide supply are closed.

In FIG. 8 the upper block is disconnected from the intermediate block. This may take place while the ship is on the ground for an emergency exit of the pilot or when the pilot leaves the ship for any reason. The connector for the cables for operating the carbon dioxide is inoperative inasmuch as the lower block is still connected to the intermediate block. The emergency oxygen supply is not released as the lanyard 18 has not pulled down the lever 45.

In FIG. 9 the lower block has been disconnected from the intermediate block as in bailing out. The lower block, being held to the ship by the lanyard 18 as the intermediate and upper blocks rise with the pilot, pulls down the lever 45, thus releasing the disconnect securing means 26–48, releases the emergency oxygen supply by a downward pull of the rod 49 and cable 53. The connector or coupling element 80 is armed inasmuch as the stud 107 has been removed with the lower block and the latching lever 108 is held unlatched by the stud 115 of the upper block. The carbon dioxide supply may be released by a pull on the handle 14 by the pilot.

FIG. 10 shows the release of the intermediate block and the survival kit by an upward pull on the cable 76 and handle 77. The carbon dioxide supply may be released at this time by a pull on the handle 14. The upper block 19 carried by and secured to the pilot is attached to the survival kit by a cable 119 of limited length, for example, twenty-five feet. It may be recovered by the pilot as he reaches the surface of the water. In the event that the pilot has not released the carbon dioxide supply before or at the time of releasing the intermediate block he releases it upon recovering the survival kit after reaching the surface of the water. As shown in FIG. 8 the cable 119 may be detached from the upper block when the pilot leaves the ship while the ship is on the ground.

Having described my invention what I claim is:

1. A disconnect and survival kit assembly for aircraft personnel comprising a kit to contain an inflatable life raft, a carbon dioxide supply for inflating a life raft, a disconnect comprising an intermediate block secured to said kit, an upper block releasably secured on said intermediate block and a lower block releasably secured to said intermediate block, manually operable means for releasing said carbon dioxide supply, said means comprising a pair of terminals and a connector releasably coupling said terminals, a coupling release means spring pressed to a position to couple said connector to at least one of said terminals and movable to a position to release said terminal from said connector, means on said lower block to move said coupling release means to release position when said lower block is connected to said intermediate block, locking means on said intermediate block, spring pressed to lock said coupling release means in release position and positioned to be unlocked by said upper block when said upper block is connected on said intermediate block whereby said coupling release means is held in release position when said lower block is connected to said intermediate block and when said lower block is disconnected after said upper block is disconnected and moves to coupling position when said lower block is first disconnected and said upper block is disconnected.

2. The disconnect of claim 1 in which said connector and coupling release means comprise a connecting rod secured to one terminal and having a ball receiving recess adjacent its free end, a hollow shuttle into which said rod extends, the wall of said shuttle having at least one opening to align with the ball receiving recess of said rod, a ball in said opening of larger diameter than the wall of said shuttle to project into said recess, and a rotatable collar on said shuttle to hold said ball into said recess in said rod and having a recess in its inner surface into which said ball may enter when said collar is rotated to align with the hole in said shuttle and said shuttle is moved longitudinally of said rod.

3. The disconnect of claim 2 in which said collar has an arm extending outwardly and in which said disconnect comprises a spring pressed plunger biassing said arm to operative position.

4. The disconnect of claim 2 having a housing enclosing said shuttle and connecting rod and having a passage in which said shuttle reciprocates.

5. The disconnect of claim 4 having a peg and longitudinal groove guide between said shuttle and said housing.

6. The disconnect of claim 5 in which the ball receiving recess of said connecting rod is a circumferential groove.

7. The disconnect of claim 3 in which said locking means comprises a latch lever spring pressed to engage and hold said arm against rotation by said plunger.

8. The disconnect of claim 7 in which said upper block has a stem to press said latch lever against the pressure of said plunger to release said arm.

9. The disconnect of claim 3, in which said means on said lower block to hold said connector in inoperative position comprises a stud to engage said arm.

10. The disconnect of claim 2 in which said means for releasing said carbon dioxide comprises a pair of cables having terminal balls in opposed position and in which said rod has a recess to receive and hold the ball of one cable and said shuttle has a recess to receive and hold the ball of the other cable.

11. The disconnect of claim 1 having an emergency oxygen supply in said kit, a release mechanism for said emergency oxygen supply comprising a cable extending into said intermediate block, disconnect means for releasable securing said lower block to said intermediate block and a common actuating means for disconnecting said lower block from said intermediate block and for first engaging and actuating and then releasing said cable.

12. The disconnect of claim 11 in which said intermediate block has a downwardly opening recess and in which said means for engaging and actuating said cable comprises an actuating rod attached to said common actuating means and having an annular upper wall having a hole therein, a collar in said lower block projecting into said recess in said intermediate block and through which said annular wall extends to bring said hole above said collar, an end of said cable projecting within said annular wall and having an annular groove open to said hole and a locking ball in said hole of larger diameter than the thickness of said annular wall, whereby said annular wall may be moved by said rod from said recess downwardly into said collar to move said ball to move into said annular groove of said cable and lock said cable to said annular wall and past said collar to release said ball and disengage said cable from said annular wall and said rod.

13. The disconnect of claim 12 in which said disconnect means comprises an upper element, a manually releasable latch to secure said upper element to said intermediate block, and a lower element secured to said lower block and having a locking engagement with said upper element which is released by actuation of said common actuating means, said manually releasable latch permitting release of said upper element and said lower block independently of said common actuating means.

14. The disconnect of claim 13 in which said intermediate and said lower block have coaxial vertical passages, in which said vertical passage of said lower block has a coaxial retaining ring secured therein, in which said upper locking element comprises an element slidable in said passages, having a latching groove at its upper end and an annular wall at its lower end projecting downwardly through said retaining ring and having a hole below said retaining ring, a ball in said hole of larger diameter than the thickness of said annular wall, and in which said lower locking element comprises a pin spring-pressed into the space within said annular wall to hold said ball into projecting engagement with said retaining ring, said lower element being connected to said common actuating means, and in which said latch comprises a sliding element slidable into and out of engagement with said latching groove.

15. The disconnect of claim 14 in which said common actuating means comprises a lever pivoted to said lower block and secured to said actuating rod and to said lower member.

16. A disconnect for aircraft which comprises an intermediate block and a lower block, said blocks having co-axial vertical passages, a co-axial retaining ring secured in the passage of the lower block, a locking element in said passages extending from said intermediate block to said lower block and having a latching groove in said intermediate block and an annular wall at its lower end extending through said retaining ring and having a hole in said wall below said retaining ring, a ball in said hole of larger diameter than the thickness of said annular wall and a second locking element comprising a pin extending into the space within said annular wall to press said ball outwardly below said retaining ring, a spring confined between said lower block and said second locking element to press said second locking element into the space in said annular wall and means to move said second locking element against said spring below said opening to permit said ball to move inwardly free from engagement with said retaining ring and to then move said lower block free from said intermediate block, said intermediate block having a latch movable to and from said engaging position with said latching groove.

17. The disconnect of claim 16 having an upper block mountable on said intermediate block and having a vertical passage, a retaining ring in said vertical passage, a collar secured to said intermediate block and extending upwardly beyond said collar and having a hole through its wall above said collar, a ball in said hole of larger diameter than the thickness of said wall, a locking pin extending downwardly into said collar to press said ball outwardly to project above said retaining ring, a spring pressing said locking pin downwardly into said collar to lock said upper and intermediate blocks and movable upwardly above said ball to permit said ball to move inwardly free of said collar and thereby to permit said upper block to be lifted free of said intermediate block.

18. The disconnect of claim 16 in which said intermediate and lower blocks have a second vertical passageway, a retaining collar secured in the vertical passage of the lower block and extending into the vertical passage of an intermediate block, a retaining element having an upper annular wall extending above said retaining collar and having a ball of larger diameter than the thickness of said annular wall in said opening to project above said retaining collar, an actuating pin extending downwardly into said annular wall and having a reduced diameter adjacent said opening in said annular wall to permit said ball to move inwardly free from said retaining collar, a spring biasing said retaining element upwardly to bring said hole above said retaining collar and a lever connected to the locking element and said retaining element to move said elements simultaneously downwardly whereby said ball in said retaining element will be pushed by said retaining collar into engagement with said actuating pin to lock it in said retaining element and move it downwardly.

References Cited in the file of this patent

UNITED STATES PATENTS

| | | |
|---|---|---|
| 2,763,451 | Moran | Sept. 18, 1956 |
| 2,859,422 | Oliveau | Nov. 4, 1958 |